United States Patent [19]

Takanashi

[11] Patent Number: 6,111,262

[45] Date of Patent: Aug. 29, 2000

[54] METHOD FOR MEASURING A DIAMETER OF A CRYSTAL

[75] Inventor: Keiichi Takanashi, Nishinomiya, Japan

[73] Assignee: Sumitomo Metal Industries, Ltd., Osaka, Japan

[21] Appl. No.: 09/182,794

[22] Filed: Oct. 30, 1998

[51] Int. Cl.[7] .................................................. G01N 15/02
[52] U.S. Cl. .............................. 250/559.19; 250/559.24; 348/135; 356/30
[58] Field of Search ........................ 250/559.19, 559.24; 348/135; 356/30, 384, 372

[56] References Cited

U.S. PATENT DOCUMENTS

| | | |
|---|---|---|
| 4,794,263 | 12/1988 | Katsuoka et al. . |
| 4,926,357 | 5/1990 | Katsuoka et al. . |
| 5,105,091 | 4/1992 | Igarashi et al. . |
| 5,138,179 | 8/1992 | Baba et al. . |
| 5,170,061 | 12/1992 | Baba . |

Primary Examiner—George Fourson
Assistant Examiner—Joannie A. Garcia
Attorney, Agent, or Firm—Oblon, Spivak, McClelland, Maier & Neustadt, P.C.

[57] ABSTRACT

A method and system for accurately measuring a diameter of a crystal including independently detecting a first intersection point and a second intersection point on a periphery of the crystal. The first intersection point and the second intersection point correspond to a respective intersection between a fusion ring formed on the periphery of the crystal and a light measuring line. The light measuring line may be produced by a camera, for example. In addition, the frequency components caused by shaking the crystal, are removed from the detected first intersection point and the detected second intersection point. In addition, a timing difference between when the first detected intersection point and the second detected intersection point intersect the light measuring line is determined. Finally, an interval between the detected first intersection point and the detected second intersection point using the determined timing difference is obtained.

5 Claims, 6 Drawing Sheets

METHOD FOR MEASURING A DIAMETER OF A CRYSTAL

BACKGROUND OF THE INVENTION

1. Field of the Invention

The present invention relates to a method of optically measuring a diameter of a single crystal formed using a Czochralski method (hereinafter referred to as the CZ method).

2. Discussion of the Background

One method of producing single crystals used in a semiconductor, for example, is the CZ method. In the CZ method, as shown in FIG. 1, a crucible 2 is filled with a crystal melt liquid 3. The crucible 2 is provided in a furnace body 1 of a CZ furnace. A single crystal 4 is pulled from the melt liquid 3 by a pulling apparatus 5 and is rotated by a rotating apparatus 6. A heater 7 evenly heats the melt liquid 3 by controlling the crucible 2 so that a heating center of the heater 7 and the melt liquid 3 are maintained in a constant positional relationship.

During the pulling operation, a shape of the single crystal 4 should be uniform in both upper and lower end portions, as well as in diameter. This desired shape should be equal to a target value, in both a body and seed crystal portion of the single crystal 4. In addition, a distortion factor defined as a minimum diameter should be equal to or lower than a predetermined minimum value. The distortion factor represents a distortion of a roundness shape of the single crystal 4.

In addition, regarding a quality of the single crystal 4, it is desired to lower a density of an oxidation induced stacking fault (hereinafter referred to as OSF) which is one evaluation item used to determine the quality of the single crystal 4. The OSF represents stacking faults which are caused due to a phenomenon where an oxygen solid solution within the single crystal 4 is precipitated as an oxide in an oxidation treatment of the single crystal 4. The density of the OSF may be reduced by quenching the single crystal 4 as the pulling speed is increased. In addition, increasing the pulling speed of the crystal 4 is beneficial because a production efficiency also increases.

However, when the pulling speed increases, the yield of the single crystal 4 is lowered because the distortion factor increases, thus exceeding the predetermined minimum value. Therefore, it is necessary to set an optimum pulling speed which is within an allowable range to achieve the desired yield, quality, etc., of the single crystal 4. Further, it is important to accurately measure the diameter of the single crystal 4, as well as to calculate an accurate distortion factor.

A first way of measuring the diameter of the single crystal 4 includes calculating the diameter based on a weight of the pulled single crystal 4 (hereinafter referred to as the weight method). Alternatively, the diameter may be measured by using an optical device, such as a one dimensional CCD camera (hereinafter referred to as the optical method).

When the crystal is pulled using the CZ method, as shown in FIG. 3, projections $4a_1$, $4a_2$, $4a_3$, and $4a_4$, appear on a peripheral portion of the single crystal 4. The projections $4a_1$–$4a_4$ are referred to as crystal habit lines, and extend in a crystallographic axis direction. Further, it is important to include the diameter of these crystal habit lines when calculating the distortion factor. However, the weight method calculates an average diameter based on the weight and length of the single crystal 4. Thus, the diameter of the crystal habit lines is not measured. On the contrary, the optical method is able to measure the diameter of the portion of the crystal habit lines, because a diameter of a high brilliant fusion ring created by an interference between the melted liquid 3 and the single crystal 4 may be optically measured.

In the optical method, as shown in FIG. 1, an interface of the single crystal 4 and the melted liquid 3 is optically measured using the one dimensional CCD camera 8 through a window 9 provided in an upper end portion of the furnace body 1. FIG. 2 illustrates that intersecting points C and C' are detected from a change in brilliance between a fusion ring A on the periphery of the single crystal 4 and a light measuring line B-B' of the one dimensional CCD camera 8, so as to measure the diameter of the single crystal 4. In addition, the detection of the intersection points C and C' are continued throughout one rotation of the single crystal 4. An interval $W(\alpha)$ of the intersection points C and C' is obtained by using the following equation to measure the diameter across the entire periphery of the single crystal 4.

$$W(\alpha)=L(\alpha)-R(\alpha)$$

$L(\alpha)$, $R(\alpha)$: detected positional data of the intersection points C and C'

$\alpha$: rotational angle of the single crystal

In this case, when the one dimensional CCD camera 8 is provided so that the light measuring line B-B' passes through a center O of the single crystal 4, the fusion ring A may not be brilliant enough which results in diameter measurement errors. Therefore, it is often impossible to measure the diameter of the single crystal 4. Thus, the light measuring line B-B' of the one dimensional CCD camera 8 is positioned on a same side as the camera 8 from the crystal center O (i.e., offset from the center O). In this case, the diameter of the single crystal 4 is measured using the following equation.

$$D=(W^2+4a^2)^{1/2}$$

D: crystal diameter
W: interval between intersection points C and C'
a: distance from crystal center O to light measuring line B-B'

In the conventional optical method, as described above, the distance W of the intersection points C and C' is calculated from the difference between the detected positional data $L(\alpha)$ and $R(\alpha)$, i.e., $[L(\alpha)-R(\alpha)]$. When an orientation of the single crystal 4 is [100] as shown in FIG. 3, the crystal habit lines $4a_1$, $4a_2$, $4a_3$, and $4a_4$ appear on the outer face of the single crystal 4 at intervals of 90°. If the light measuring line B-B' of the one dimensional CCD camera passes through the center O of the single crystal 4, the two crystal habit lines $4a_1$ and $4a_3$, for example, simultaneously coincide with the light measuring line B-B'. Therefore, if the fusion ring A was brilliant enough, the diameter of the single crystal 4 including the crystal habit lines $4a_1$ and $4a_3$ may be measured with comparatively high precision using the difference between the detected positional data $L(\alpha)$ and $R(\alpha)$ of the intersection points C and C'.

However, as described above, the light measuring line B-B' is offset from the crystal center O. In this case, the two crystal habit lines $4a$, and $4a_3$ do not simultaneously coincide with the light measuring line B-B'. That is, when the crystal habit line $4a$, coincides with the light measuring line B-B', the crystal habit line $4a_3$ does not coincide with this line. The same is true for the crystal habit lines $4a_2$ and $4a_4$. Thus, in the conventional optical method which obtains the interval W of the intersecting points C and C' from the difference between the detected positional data L(α) and R(α), the diameter measuring accuracy is considerably reduced near the crystal habit lines $4a_1$, $4a_2$, $4a_3$ and $4a_4$.

In addition, as the crucible rises, an error is caused in a liquid surface position because an accurate liquid phase positional detection method is not used. As a result, the light measuring line B-B' of the one-dimensional CCD camera 8 is deviated from an initially set position. That is, the distance "a" from the crystal center O to the light measuring line B-B' is changed. Thus, this error is included in the measured diameter D.

To solve this problem, the Japanese Patent Application Laid-Open No. 63-256594, discloses a method of moving the light measuring line B-B' of the one-dimensional CCD camera 8 in a direction at a right angle to the line. Then, a diameter value is established using a crystal diameter measured before and after the movement, as well as a moving distance of the light measuring line B-B'. However, this method does not solve the problem that the diameter measuring precision is reduced near the crystal habit lines from the light measuring line B-B' being offset from the crystal center O.

In light of this situation, the present inventor developed (Japanese Patent Application Laid-Open No. 7-282460, which is incorporated herein by reference in its entirety) a single crystal diameter measuring method which includes independently detecting the intersection positions on two sides of the crystal, respectively. This is achieved by detecting the intersection positions on two sides of the crystal from a brilliance change in the intersection points C and C' between the fusion ring A and the light measuring line B-B' of the camera. In addition, a timing difference θ corresponding to the intersection point positional changes on the two sides of the crystal is determined by the position of the light measuring line B-B' of the camera and the detected intersection point positional data L(α) and R(α). Further, the detected intersection positional data L(α) and R(α) is compared, taking into account the timing difference θ, so as to increase the diameter measuring precision near the crystal habit lines.

In summary, a single crystal formed using the CZ method includes crystal habit lines in a peripheral direction intrinsic to the crystal orientation, as described above. When, for example, the crystal orientation is (100), a crystal habit line occurs every 90°. When a respective crystal habit line crosses the light measuring line B-B' of the one-dimensional CCD camera, the intersection point position between the fusion ring A and the light measuring line B-B' changes.

When the light measuring line B-B' passes the crystal center O, the changes in the intersection point position occur simultaneously. However, when the light measuring line B-B' is separated from the crystal center O, a dispersion results from the timing difference θ of the intersection point position. In addition, the timing difference θ becomes larger as the distance from the crystal center O to the light measuring line B-B' is increased.

However, the single crystal is also shook, during the pulling operation with a period of four times during one revolution. When the single crystal is shook to the right and left as seen from the one-dimensional CCD camera, the influence of this shaking may be removed by determining the difference of the detected intersection point positional data L(α) and R(α). However, when the single crystal is shook longitudinally, the distance from the light measuring line B-B' to the crystal center O changes, which reduces the diameter measuring precision. In addition, the precision of the measuring process is further complicated and reduced because the single crystal is shook at the same time it is pulled and rotated. That is, shaking the single crystal has a large effect on the precision of the diameter measuring process.

SUMMARY OF THE INVENTION

Accordingly, one object of this invention is to provide a novel crystal diameter measuring system and method which prevents a reduction of the diameter measuring precision near a crystal habit line caused due to separating a light measuring line from a crystal center, and also for removing the influences caused by shaking the crystal, so as to correctly measure a diameter across an entire periphery of the crystal.

These and other objects of the present invention are achieved by providing a novel crystal diameter measuring system and method which includes independently detecting a first intersection point and a second intersection point on a periphery of the crystal. The first intersection point and the second intersection point correspond to a respective intersection between a fusion ring formed on the periphery of the crystal and a light measuring line. The light measuring line may be produced by a camera, for example. In addition, to accurately measure the diameter of the crystal, frequency components caused by shaking the crystal, are removed from the detected first intersection point and the detected second intersection point. In addition, a timing difference between when the first detected intersection point and the second detected intersection point intersect the light measuring line is determined. Then, an interval between the detected first intersection point and the detected second intersection point using the determined timing difference is obtained.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
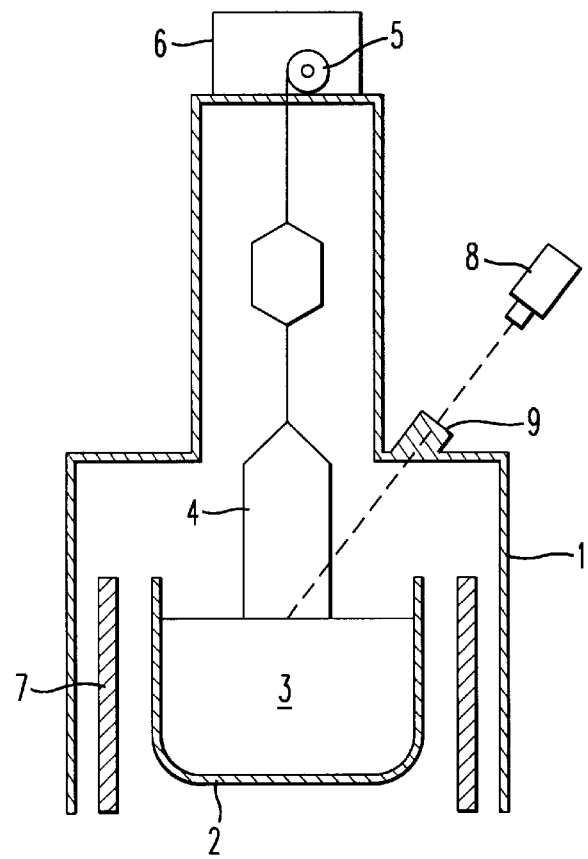
FIG. 1 is a perspective view of an apparatus for forming a single crystal using a Czochralski (CZ) method.
Figure 2:
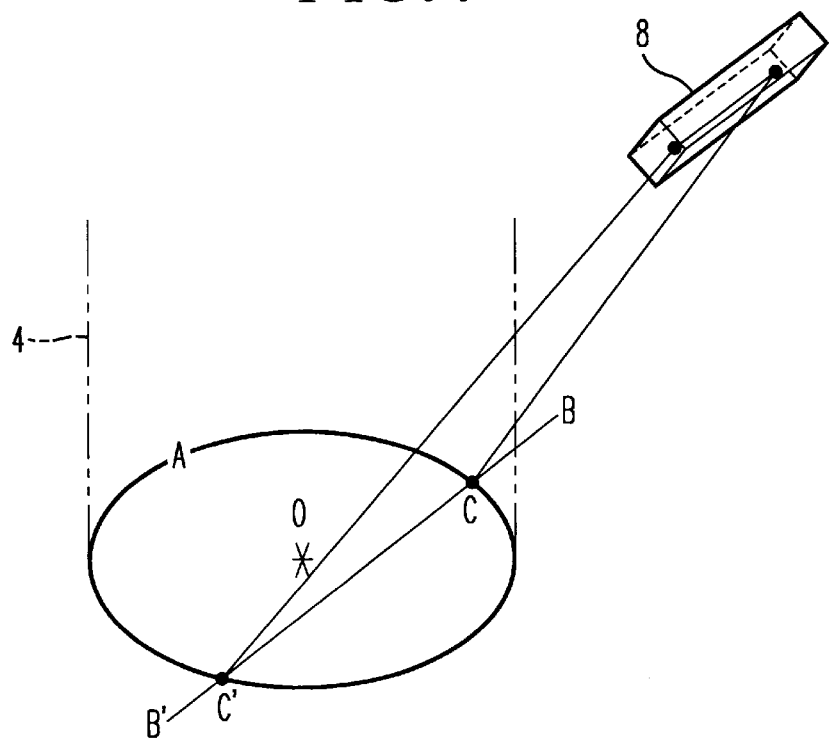
FIG. 2 is a perspective view of a method of measuring a diameter of the single crystal.

Referring now to the drawings, wherein like reference numerals designate identical or corresponding parts throughout the several views, and more particularly to FIG. 1 thereof, there is illustrated an apparatus used for measuring a diameter of a single crystal 4 according to the present invention. As shown in FIG. 1, a one dimensional CCD camera 8 is provided at an outside position of a furnace body 1. Alternatively, a two dimensional CCD camera or the like may be used. The camera 8 photographs a surface of a melted liquid 3 disposed within a crucible 1 through a window 9 formed in the furnace body 1. In addition, as illustrated in FIG. 2, a position of intersection points C and C' may be independently detected, respectively, based upon a change in brilliance resulting from an intersection of a fusion ring A formed on a peripheral portion of the single crystal 4 and a light measuring line B-B' of the one dimensional CCD camera. This detection is continued with a constant pitch with respect to a rotary angle of the single crystal 4, while the single crystal 4 performs one rotation.

Figure 3:
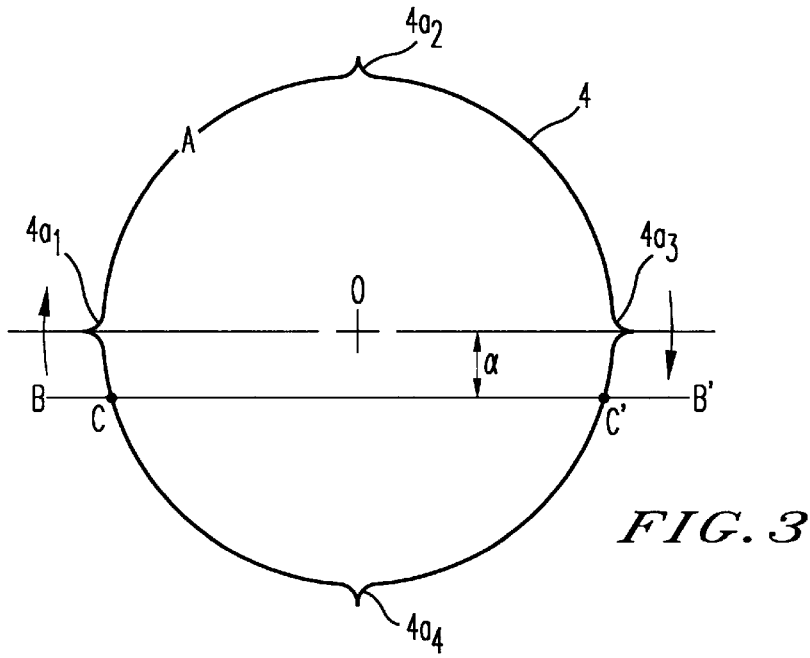
FIG. 3 is a perspective view illustrating a positional relationship between a light measuring line of a camera and a center of the single crystal.

The single crystal 4, which is formed using the CZ method, includes four crystal habit lines $4a_1$, $4a_2$, $4a_3$, and $4a_4$ on a peripheral portion of the single crystal 4. In FIG. 3, a crystal orientation (100) is shown, and the four crystal habit lines $4a_1$, $4a_2$, $4a_3$, and $4a_4$ occur every 90°. In addition, the CZ method includes pulling the single crystal 4 with the pulling apparatus 5 and rotating the single crystal 4 with the rotating apparatus 6. Thus, as discussed previously, when the crystal habit lines $4a_1$–$4a_4$ cross the light measuring line B-B', the corresponding intersection point C or C' changes.

For example, when the single crystal 4 is rotated clockwise, the crystal habit line $4a_1$ passes the light measuring line B-B' in a left-hand side measuring position, and a positional change in the intersecting point C occurs. Then, the crystal habit line $4a_3$ passes the light measuring line B-B' in a right-hand side measuring position, and a positional change in the intersection point C' occurs. Thus, a timing difference in the positional change occurs for the intersection points C and C' on both sides of the single crystal 4.

Figure 6:
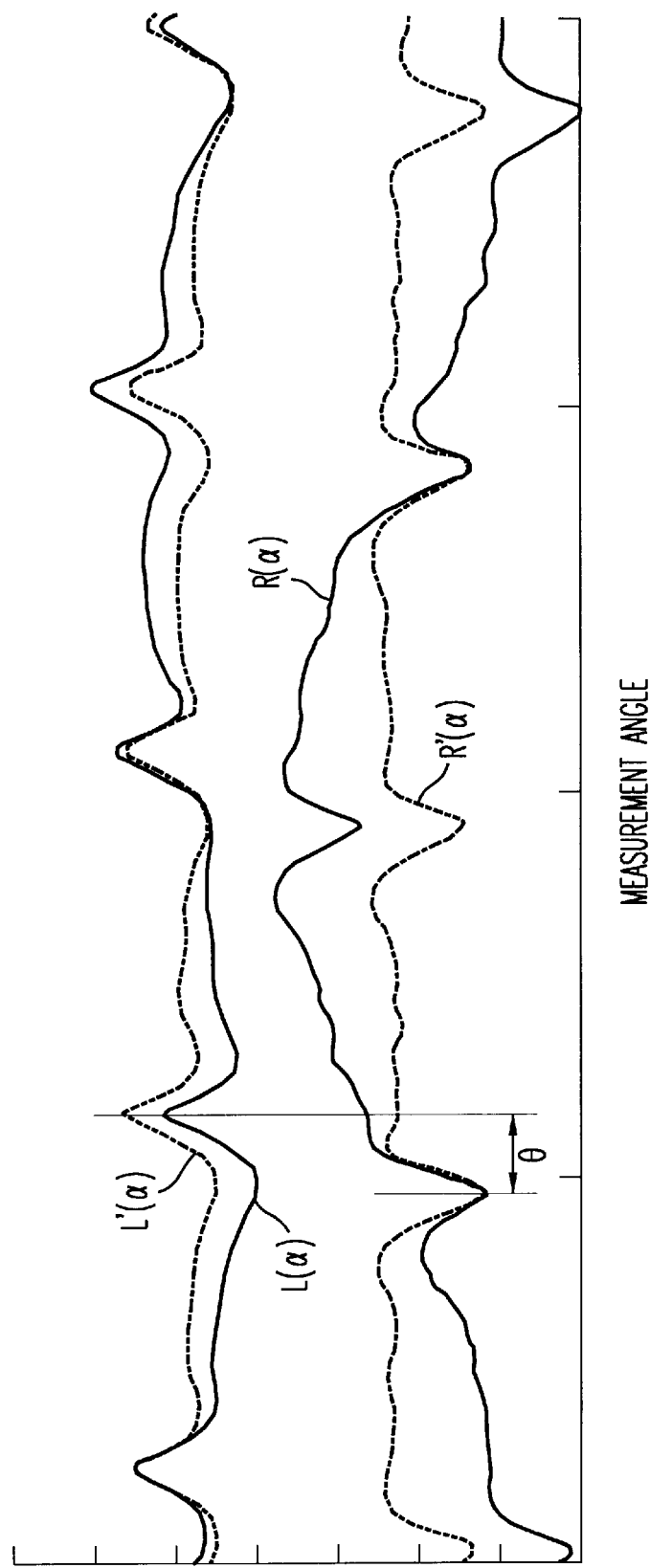
FIG. 6 is a graph illustrating the influences of the detected intersection point positional data when the single crystal is shook in the CZ method.

A solid line drawn in FIG. 6 illustrates the detected intersection point positional data L($\alpha$) and R($\alpha$) on both sides of the single crystal 4. In addition, the single crystal 4 has a crystal orientation (100) and is pulled while being rotated in a clockwise direction. Further, as discussed above, the detected positional data L($\alpha$) and R($\alpha$) changes due to the light measuring line B-B' being offset from the crystal center O. As illustrated in FIG. 6, the right-hand side change is detected, and is delayed by a value $\theta$ from the left-hand side change. The broken line drawn in FIG. 6 illustrates the detected intersection point positional data L'($\alpha$) and R'($\alpha$) after components caused by shaking the single crystal 4 have been removed.

In addition, because the diameter of the single crystal 4 does not suddenly change, the detected intersection point positional data L($\alpha$) and R($\alpha$) should generally be constant except when either of the crystal habit lines $4a_1$–$4a_4$ cross the light measuring line B-B'. However, as illustrated by the solid line in FIG. 6, the detected intersection point positional data L($\alpha$) and R($\alpha$) actually do change. This change is due to shaking the single crystal 4. Thus, the influence from shaking the crystal, together with the timing difference $\theta$ of the detected intersection point positional data L($\alpha$) and R($\alpha$), results in a reduction of the precision of the diameter measuring process.

Figure 4:
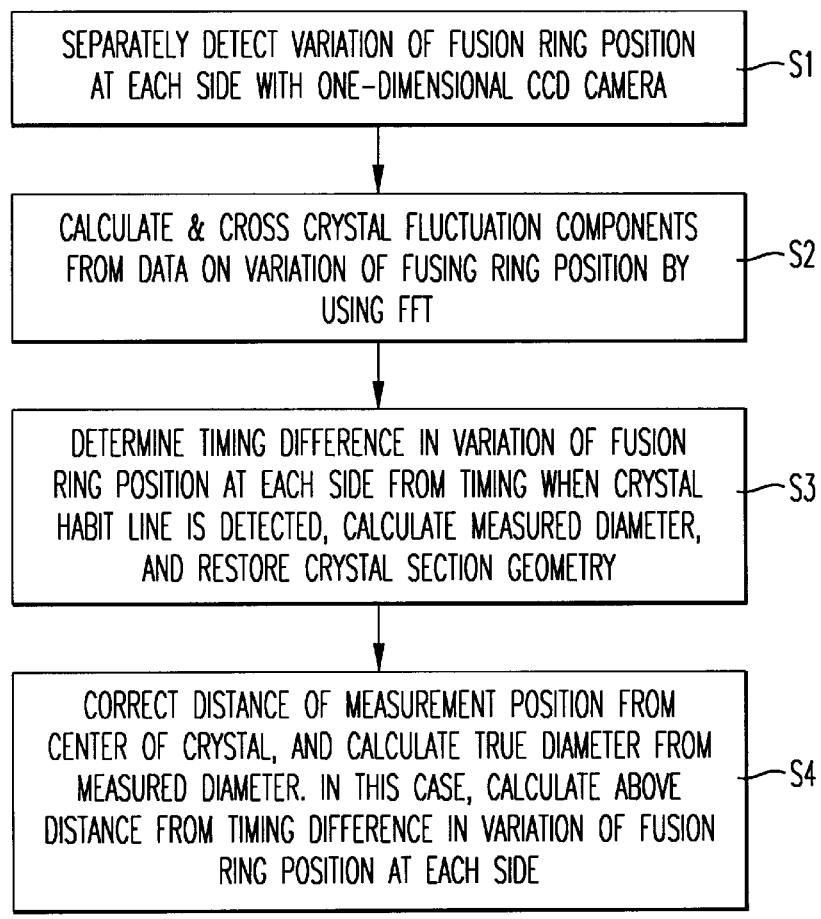
FIG. 4 is a flow chart illustrating the diameter measuring procedure according to the present invention.

In the crystal diameter measuring method according to the present invention, as shown in FIG. 4, the positions of the intersection points C and C' on both sides of the single crystal 4 are independently detected (step S1). Then, the components resulting from shaking the single crystal 4 may be removed from the respective detected intersection point positional data L($\alpha$) and R($\alpha$). This may be achieved, by, for example, the following method.

A Fast Fourier Transform (FFT) is performed on the detected intersection positional data L($\alpha$) and R($\alpha$), so as to obtain corresponding frequency components expressed by respective time functions (step S2), as illustrated by equation 1.

$$f(x) = \sum_{n=0}^{m} a_n \sin(nx + \alpha_n) \tag{1}$$

f(x): detected intersection point positional data
x: rotating angle of the crystal
$a_n$: n-th order amplitude component
$\alpha_n$: phase difference of n-th order component The detected intersection point positional data L($\alpha$) and R($\alpha$) are represented with f(x) to illustrate the frequency components.

Figure 5:
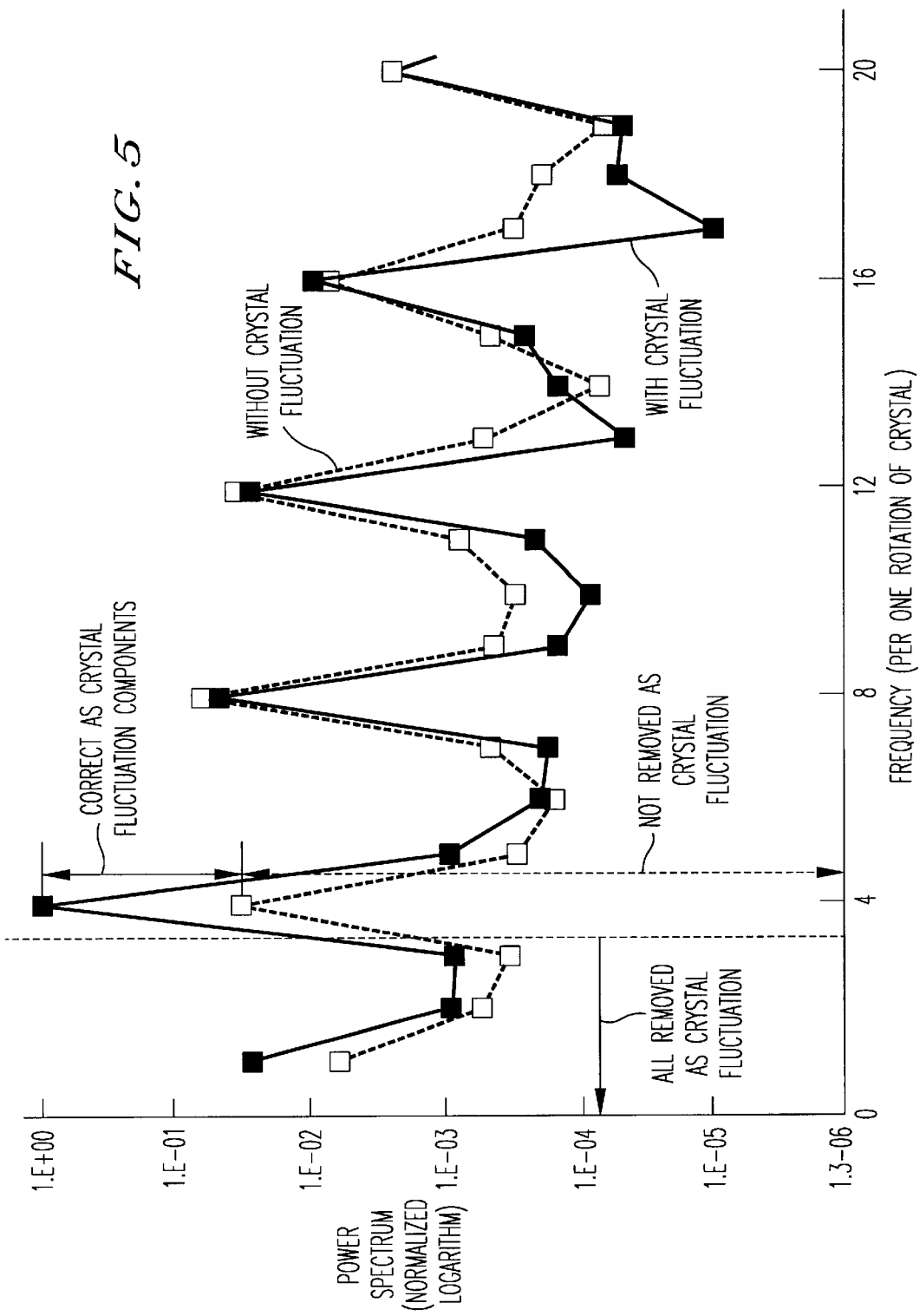
FIG. 5 is a graph showing frequency components of detected intersection point positional data.

The frequency components of f(x) are illustrated as a solid line in FIG. 5. The broken line in FIG. 5 illustrates frequency components without a substantial fluctuation of the single crystal 4 (i.e., the single crystal 4 is not shaken).

In addition, step S3 of FIG. 4 determines the timing difference $\theta$ in variation of the fusion ring position A at each side when the crystal habit line is detected, calculates a measured diameter, and restores the crystal section geometry. Further, step S4 corrects the distance of the measurement position from the center of the crystal, as well as calculates a true diameter from the measured diameter. In this case, the above distance is calculated from the timing difference and variation of the fusion ring A positioned at each side.

As discussed above, the single crystal 4 is shaken four times per revolution during the pulling operation (CZ method). The lower order frequency components caused by shaking the single crystal 4 are removed. When all of these shaking components are removed, the measuring error becomes larger. This is because the components of the crystal shape, as well as the component due to the shaking, are removed when the fourth order frequency components are removed, since four crystal habit lines occur every 90° in the case of a crystal orientation (100). Thus, the third order and lower components (amplitudes) of f(x) are removed as influences of shaking the crystal as illustrated in FIG. 5. However, the amplitude of the fourth order component is determined to be a fourth order amplitude caused by shaking the crystal minus a fourth order amplitude of the crystal shape (i.e., A in equation 2) when the crystal is not shook. The value "A" is predetermined. Thus, the frequency components, when the single crystal is not shaken or the shaking is very small, remain. By removing the frequency components in this manner, the below equation 2 is obtained:

$$f(x)=f(x) - \{a_1 \sin(x+\alpha_1)+a_2 \sin(2x+\alpha_2) +a_3 \sin(3x+\alpha_3)+(a_4-A)\sin(4x+\alpha_4)\} \tag{2}$$

F(x): data after correction
A: amplitude (preset) of fourth component caused by the crystal shape Even if the frequency component where the shaking of the single crystal with the broken line in FIG. 5 substantially does not exist, spectra exist in the first through third order items. When the orientation of the single crystal is (100), the spectra in the first through third order items caused by crystal shaking are extremely small, such as 0.2 mm or less.

When the data L'(α) and R'(α), where the portions caused by shaking the single crystal are removed, are obtained about the detected intersection point positional data L(α) and R(α) on both sides of the single crystal 4, the timing difference θ of the intersection point position changes is obtained from the distortion of the detected intersection point positional data L'(α) and R'(α), as shown in FIG. 6. In order to remove the timing difference θ, the interval W(α) of the intersection points C and C' on both sides of the single crystal 4 is obtained (see FIGS. 7 and 8) using the below equation 3.

$$W(\alpha)=R'(\alpha+\theta)-L'(\alpha) \quad (3)$$

When the single crystal 4 is pulled and rotated counter-clockwise, the interval W(α) of the intersection points C and C' on both sides of the single crystal 4 is obtained by using the below equation 4.

$$W(\alpha)=R'(\alpha)-L'(\alpha+\theta) \quad (4)$$

In addition, the measured interval W(α) is converted into the crystal diameter D(α) using the below equation 5

$$D=(W^2+ra^2)^{1/2} \quad (5)$$

Figure 7:
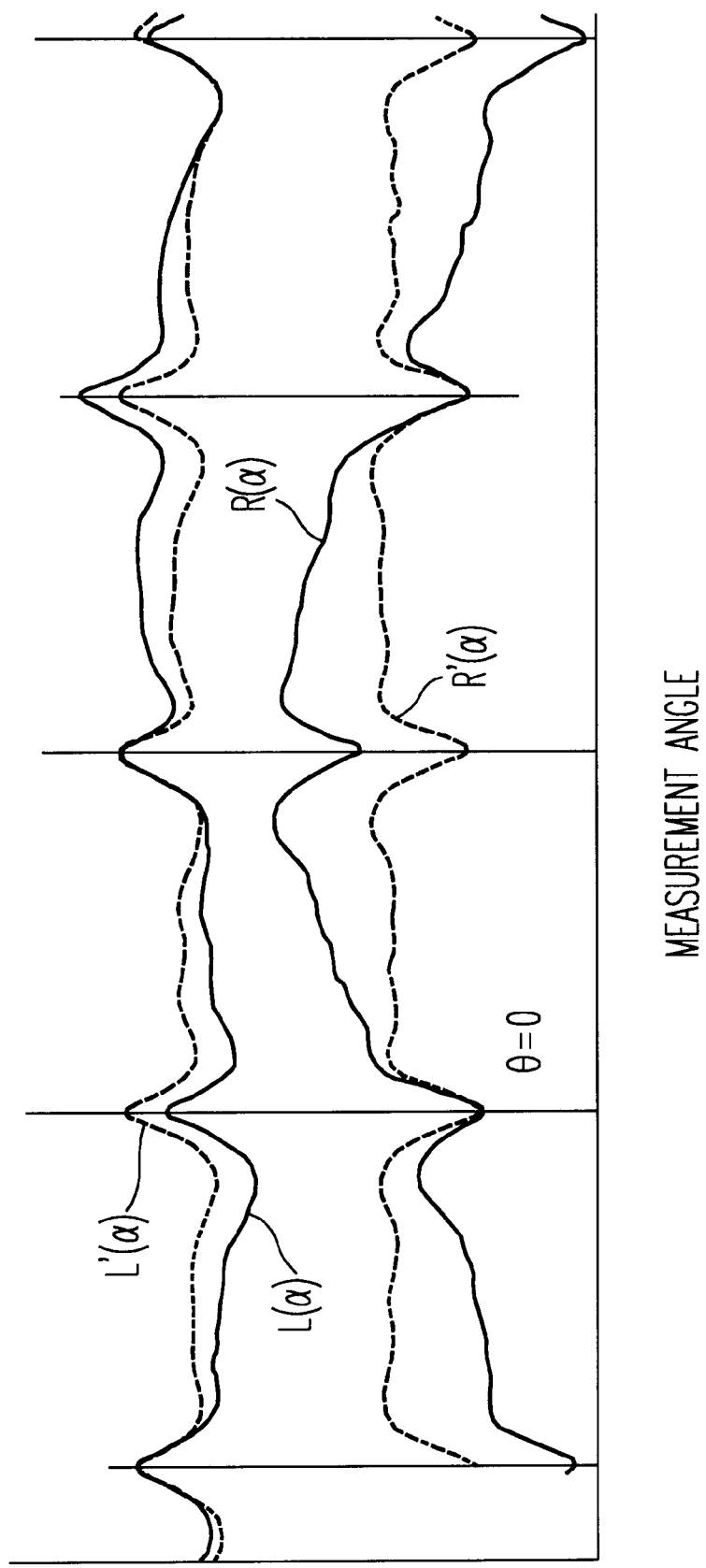
FIG. 7 is a graph illustrating detected intersection point positional data after a timing difference θ of the detected intersection point positional change has been removed.
Figure 8:
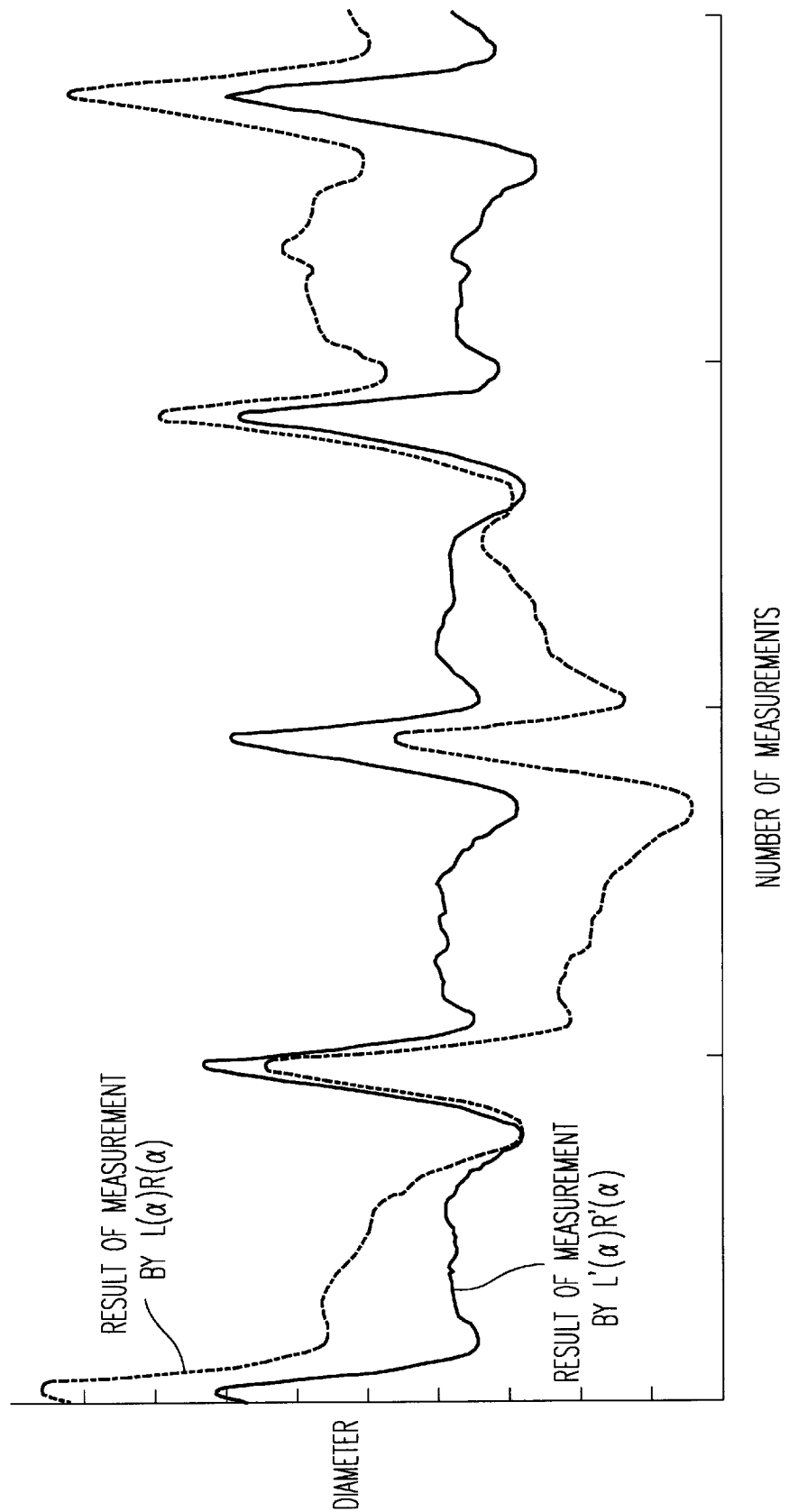
FIG. 8 is a graph illustrating the removal of the influences caused by the timing difference θ and the single crystal being shook in the CZ method.

The method of this invention, as shown in FIGS. 6 and 7, removes not only the timing difference θ of the intersection point position changes on both sides, but also the influences caused by shaking the single crystal. As a result, the crystal diameter D(α) is measured correctly as shown in FIG. 8. The broken line in FIG. 8 illustrates a case in which only the timing difference θ is removed. The solid line illustrates a case where the timing difference θ and the influences caused by shaking the single crystal are removed.

The distance "a" from the crystal center to the light measuring line B-B' changes by moving the surface position of the melted liquid 3 up and down. When the distance "a" changes, the timing difference θ of the intersection point position also changes. Namely, as the distance "a" from the crystal center O to the light measuring line B-B' increases, the timing difference θ also increases. The distance "a" may be corrected by using the below equation 6

$$a=Wavg/2\cdot\sin^{-1}(\theta/2) \quad (6)$$

Wavg: average distance at the previous measuring time

Thus, a measuring error caused by a change in the surface position of the melted liquid is also removed.

Further, it is desired that a pitch for detecting the positions of the intersection points C and C' be 2° or lower for the rotating degree of the single crystal during the pulling operation. This is because the shape near the crystal habit line has to be accurately obtained. The present inventors confirmed that with a 1° pitch, the diameter which passes near the crystal habit may be accurately measured, whereas the diameter could not be accurately measured in the conventional method. In fact, there was over a fifty percent increase in the accuracy of the diameter measurement according to the present method. In addition, monitoring the multi-crystallization of the single crystal during the pulling operation may be operated automatically, because the position of the crystal habit lines can be detected correctly from the measured diameter.

This invention may be conveniently implemented using a conventional general purpose digital computer or micropro-cessor programmed according to the teachings of the present specification, as will be apparent to those skilled in the computer art. Appropriate software coding can readily be prepared by skilled programmers based on the teachings of the present disclosure, as will be apparent to skilled in the software art. The invention may also be implemented by the preparation application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A method of measuring a diameter of a crystal, comprising the steps of:
   independently detecting a first intersection point and a second intersection point on a periphery of said crystal, said first intersection point and said second intersection point corresponding to a respective intersection between a fusion ring formed on said periphery of said crystal and a light measuring line;
   removing components, caused by shaking said crystal, from the detected first intersection point and the detected second intersection point;
   determining a timing difference between when said first detected intersection point and said second detected intersection point intersect said light measuring line; and
   obtaining an interval between the detected first intersection point and the detected second intersection point using said determined timing difference.

2. A method according to claim 1, wherein said step of removing comprises:
   obtaining respective frequency components of the detected first intersection point and the detected second intersection point; and
   removing respective lower order obtained frequency components corresponding to shaking the crystal from the obtained frequency components.

3. A method according to claim 2, further comprising the step of:
   determining in advance respective frequency components corresponding to a shape of the crystal when the crystal is not shaken.

4. A method according to claim 1, wherein said step of independently detecting the first intersection point and the second intersection point is performed a plurality of times while said crystal is rotated.

5. A method according to claim 1, wherein said step of independently detecting the first intersection point and the second intersection point is performed at least every 2° while said crystal is rotated.

* * * * *